United States Patent

[11] 3,586,027

| [72] | Inventors | John J. Fitzgerald, Jr. |
| | | 1329 Crampton, Dallas, Tex. 75207; |
| | | Wayelon C. Penland, Lewisville, Tex. |
| [21] | Appl. No. | 717,863 |
| [22] | Filed | Apr. 1, 1968 |
| [45] | Patented | June 22, 1971 |
| [73] | Assignee | said Penland assignor to said Fitzgerald |

[54] AUTOMATIC PRESSURE CONTROLLER
11 Claims, 7 Drawing Figs.

[52] U.S. Cl. ................................................. 137/87,
137/487.5, 138/46, 251/122, 251/133, 318/610
[51] Int. Cl. ............................................... F16k 31/02,
G05d 16/20
[50] Field of Search .......................................... 137/87, 88,
485, 487.5; 318/20.395

[56] References Cited
UNITED STATES PATENTS

| 2,816,570 | 12/1957 | Coulbourn et al. | 137/487.5 |
| 2,830,244 | 4/1958 | Davis | 318/20.395 |
| 2,830,245 | 4/1958 | Davis et al. | 318/20.395 |
| 2,843,147 | 7/1958 | Penther | 137/487.5 |
| 2,863,287 | 12/1958 | Berkman | 137/487.5 X |
| 3,008,072 | 11/1961 | Jenkins et al. | 318/20.395 X |
| 3,077,552 | 2/1963 | Koppel | 137/487.5 X |
| 3,225,785 | 12/1965 | Goike | 137/487.5 X |

FOREIGN PATENTS

| 103,755 | 4/1938 | Australia | 137/87 |

OTHER REFERENCES
CONTROL ENGINEERING, July 1961, p. 131

Primary Examiner—William F. O'Dea
Assistant Examiner—David J. Zobkiw
Attorney—Howard E. Moore

ABSTRACT: An automatic pressure controller which controls the pressure in a vacuum chamber by regulating the flow of gas into or out of the chamber with a valve controlled by a double loop servosystem in which a position feedback signal from the valve prevents the valve from being moved past the equilibrium position to reduce "hunting."

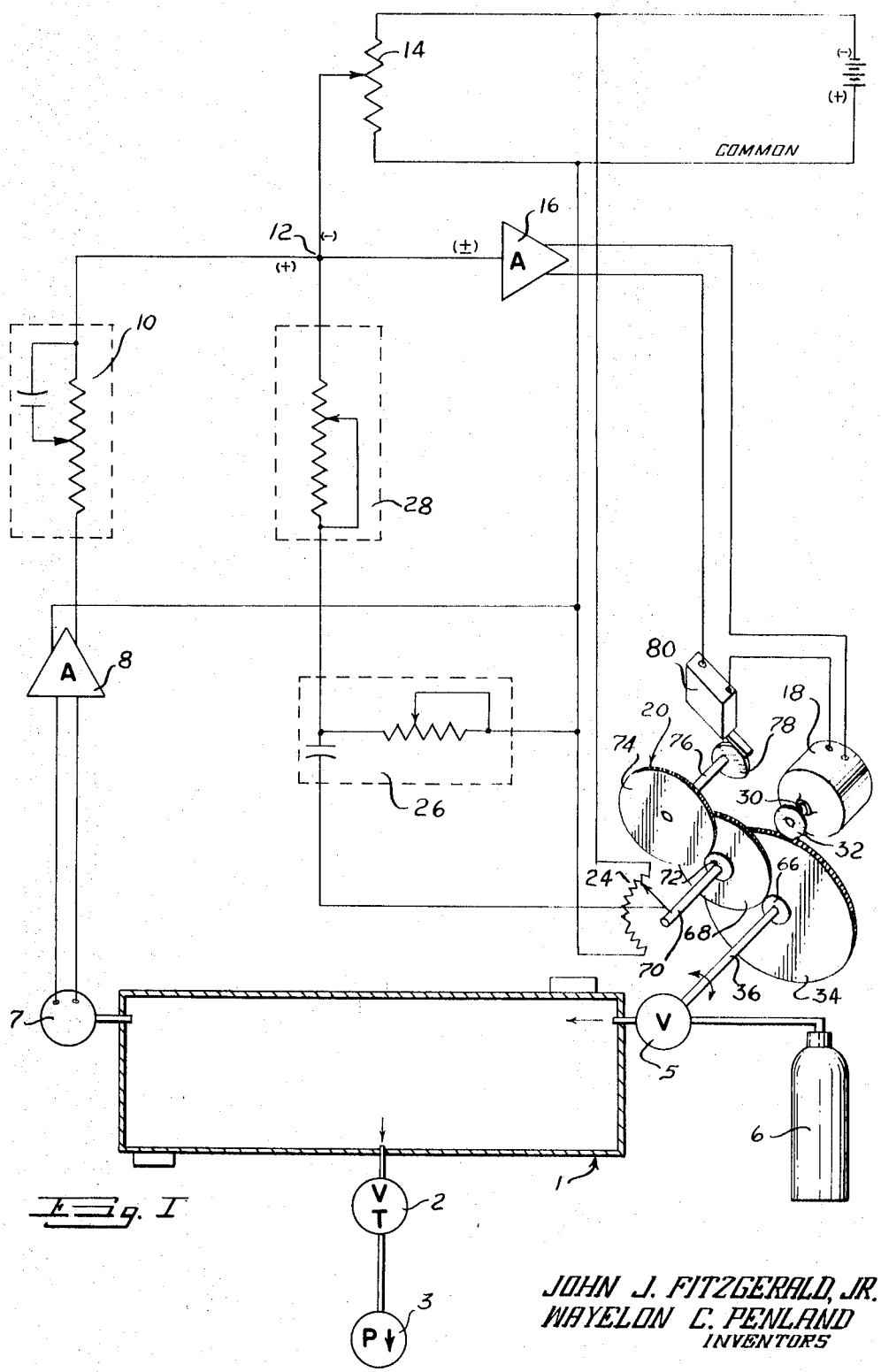
Fig. I
JOHN J. FITZGERALD, JR.
WAYELON C. PENLAND
INVENTORS
BY Howard E. Moore
ATTORNEY

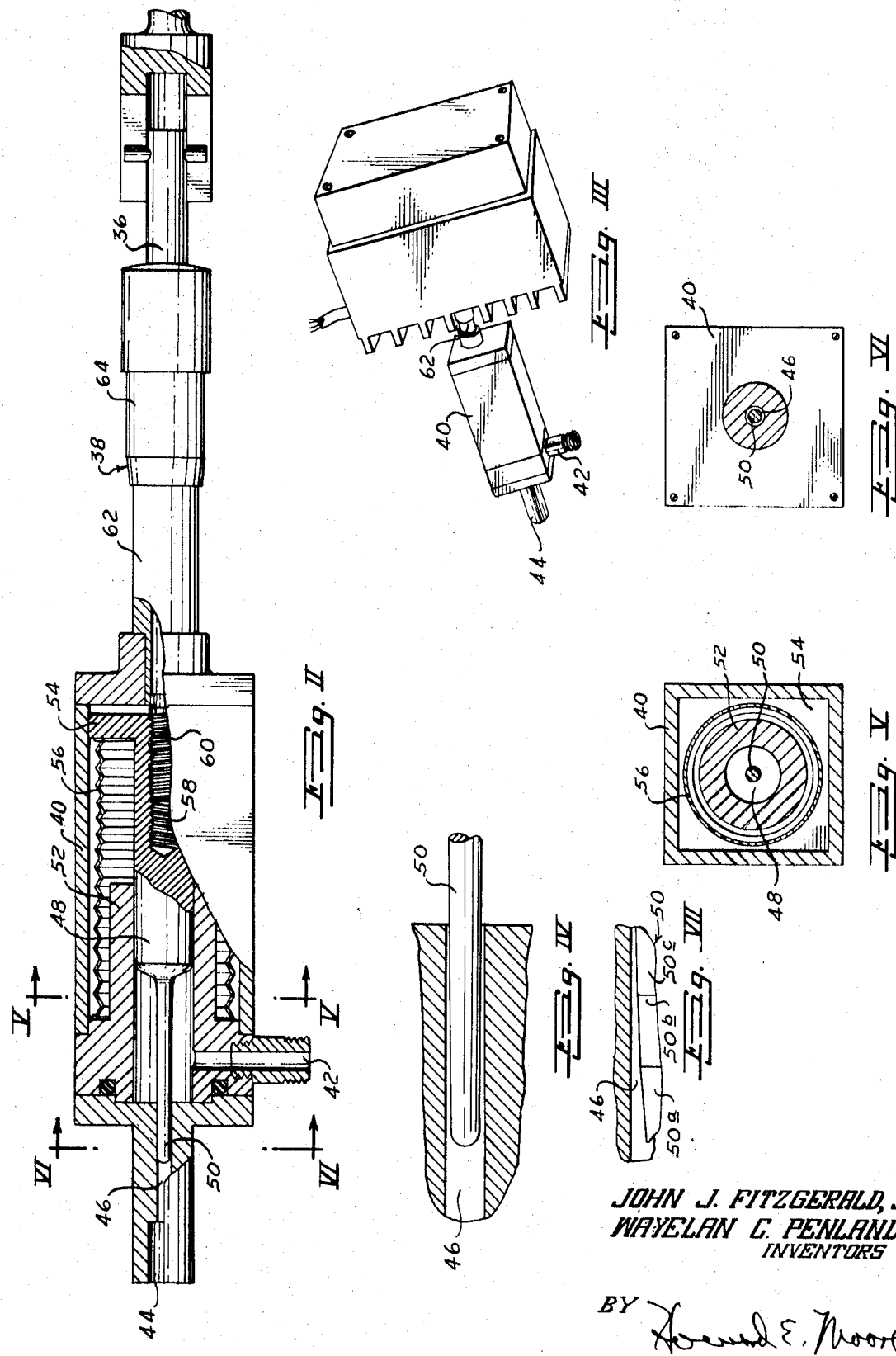

AUTOMATIC PRESSURE CONTROLLER

BACKGROUND OF THE INVENTION

Vacuum chambers are often used to prevent influence of the atmosphere on processes being carried on within the space enclosed therein. The object of an automatic pressure controller for a vacuum system is to control the absolute pressure in the vacuum chamber by admitting a controlled amount of gas to the chamber while the vacuum pump continuously removes gas from the chamber, or alternatively gas may be admitted to the chamber at a fixed rate while the pressure is controlled by a throttling valve in the vacuum line, or the gas inlet and vacuum throttling valve opening can be varied simultaneously.

Automatic pressure controllers heretofore developed utilize the signal from a pressure measuring instrument or transducer which converts pressure by some means to an electrical signal. The output of the transducer which is proportional to the actual pressure in the vacuum chamber is compared to a "setpoint" signal which is proportional to the desired pressure. The resulting difference in pressure, or "error signal" is then amplified and the output of the amplifier is used to drive a pressure control valve to change the size of the opening which communicates with the atmosphere outside the vacuum chamber. The change in opening of the pressure control valve will result in a change in chamber pressure. When the chamber pressure is equal to the desired value, the electrical signal from the transducer will be equal to the setpoint signal and the output of the amplifier will be zero. The control valve will then stop opening or closing.

The above described controller is known as a single loop servosystem. As long as the size of the vacuum chamber is relatively small in comparison to the size of the vacuum pump this type of controller system operates satisfactorily because a small volume of gas changes the pressure within the chamber an appreciable amount and consequently there is very little time lag between the movement of the control valve and the achievement of the equilibrium pressure corresponding to the new valve opening.

When the vacuum chamber is large compared to the capacity of the vacuum pump, the single loop servosystem is not satisfactory because a larger volume of gas is required to make an appreciable change in the pressure inside the chamber and consequently the time lag between the movement of the control valve and the achievement of an equilibrium pressure corresponding to the new valve opening is too great. At the instant the valve reaches that position which will give the flow rate of gas for a desired chamber pressure under equilibrium conditions, the chamber will not immediately be at the desired pressure; therefore, the "error signal" will drive the control valve past its proper position. When the desired pressure is reached in the vacuum chamber, the valve will be in a position too far in the opposite direction from that which it occupied when the "error signal" was first generated. The process will then be repeated in reverse, resulting in infinite "hunting."

SUMMARY OF INVENTION

The present invention utilizes a position feedback signal from the control valve to make a double loop servosystem. This position feedback signal is generated by a transducer mechanically connected to the valve which gives an electrical signal proportional to the valve position. This feedback signal is combined with the "error signal" resulting from the comparison of the pressure signal to the setpoint signal. The arrangement of the system is such that a change in the original "error signal" causes a movement of the control valve which results in a change in the value of the feedback signal opposite in polarity to the change in the "error signal"; thus, the signal which goes into the amplifier to cause additional control valve movement is reduced by an amount proportional to the change in valve position already accomplished. With this double loop servosystem the valve is not driven so far past the equilibrium position and there is less tendency to "hunt."

The primary object of the present invention is to provide a novel automatic pressure controller that will maintain desired pressures in a vacuum chamber despite changes in outgassing, pumping speed and supply pressure under the most adverse vacuum system response conditions.

A further object of the present invention is to provide a pressure controller which rapidly corrects violent upsets to system conditions and accommodates rapid setpoint changes.

A further object of the present invention is to provide a pressure controller with position feedback in which valve movement would be proportional to the "error signal" or difference between actual system pressure and the desired pressure thereby eliminating excessive cycling as a result of excessive valve movement when the pressure reaches the setpoint.

A still further object of the present invention is to provide a stable pressure controller effective over a wide range of operating conditions including such slow responding systems as those with large chambers, pumping systems that are small in comparison with chamber size and with thermocouple and Pirani-type vacuum gauges.

A still further object of the present invention is to provide a controller which can be connected between a leak test manifold and a mass spectrometer leak detector so that the pressure controller maintains a constant pressure in the leak detector as the manifold is roughed out to detect leaks during the roughing cycle that are ordinarily missed in mass spectrometer checking.

A still further object of the present invention is to provide a controller which will quickly and effectively at any point within its throughput range, without regard to the initial pressure, provide automatic control action without operator attention. This is highly desirable when the pressure control point must be changed frequently or rapidly, either manually or from an external source such as a program generator or a computer.

A still further object of the present invention is to eliminate damage resulting from overshooting the pressure control point and exceeding allowable foreline pressure in a diffusion pump or other equipment sensitive to under- and overpressure.

A still further object of the present invention is to provide a variable conductance valve having a nonrotating needle driven by a two-phase variable torque servomotor with a precision potentiometer proving position feedback to the control unit.

A still further object of the present invention is to provide a pressure controller having a valve with an elongated tubular seat portion and a needle with a very slight taper on the outer end offering precision control.

A still further object of the present invention is to provide a valve with a micrometer position indicator on the valve for precise throughput calibration.

A still further object of the present invention is to provide a pressure controller having a proportional band attenuator for varying the magnitude of the valve position feedback signal relative to the "error signal."

A still further object of the present invention is to provide a pressure controller with a variable decay circuit to prevent permanent discrepancies between the actual pressure input signal and the setpoint signal due to the valve position feedback signal, allowing reliable calibration between the setpoint and the vacuum gauge which is independent of the gas load or the capacity of the vacuum pump.

Other and further objects of the invention will become apparent upon reading the detailed specification hereinafter following and by referring to the drawings annexed hereto.

DESCRIPTION OF THE DRAWING

A suitable embodiment of the invention is shown in the attached drawings wherein, FIG. I is a diagrammatic view of the automatic pressure controller illustrated in relation to a vacuum chamber and vacuum pump;

FIG. II is a cross-sectional view of the control valve showing a novel tubular seat and needle construction;

FIG. III is a perspective view of the valve and means for actuating the valve;

FIG. IV is an enlarged cross-sectional view of the tubular seat and needle of the valve;

FIG. V is a sectional view taken along lines V-V of FIG. II;

FIG. VI is a sectional view taken along lines VI-VI of FIG. II; and

FIG. VII is an enlarged sectional view of a segment of the needle showing the variable taper.

Numeral references are employed to indicate the various parts as shown in the drawing and like numerals indicate like parts throughout the various figures of the drawing.

DESCRIPTION OF A PREFERRED EMBODIMENT

Referring to the drawing, the numeral 1 generally designates a vacuum chamber which may be evacuated through throttle valve 2 by a vacuum pump 3. Control valve 5 is provided for admitting a controlled amount of gas to the chamber known as the throughput while the vacuum pump 3 continuously removes gas from the chamber. It is contemplated that the present invention be used with vacuum chambers having a throughput of about $3 \times 10^{14}$ to $1 \times 10^3$ torr-liters per second with atmospheric pressure at inlet allowing precision control of chamber pressures to less than $1 \times 10^{16}$ torr with a normal 6-inch diffusion pump system.

The chamber pressure may be controlled from a very high vacuum to maximum pressures in the vicinity of 50 p.s.i. by the control valve 5 which may be moved from full open to full closed position in less than 5 seconds.

Control valve 5 is positioned to regulate the flow rate from a source of gas 6 to the chamber 1, and is operated electrically and automatically controlled by a double loop servosystem.

An electrical signal proportional or at least related in some fashion to the absolute pressure in the vacuum chamber 1 may be produced by a vacuum gauge or other suitable source 7. This can be any one of a variety of available instruments such as ionization gauges, thermocouple gauges, cold cathode discharge gauges, capacitance manometers or strain gauge transducers. The electrical output signal of the transducer 7 is the input to the controller.

An input amplifier 8 increases the magnitude of the signal provided by the transducer 7, representing the actual pressure inside the vacuum chamber, to a value of workable magnitude.

A variable lead rate control circuit 10, represented by a capacitor connected in parallel with a resistance in the drawing is a component which receives the input signal from the input amplifier 8 and causes rapid changes in pressure to generate a larger signal than slow pressure changes.

The output of the variable lead circuit 10 is connected to junction 12 where it is compared with a setpoint signal generated either within the automatic pressure controller or from a remote station which is adjusted through a variable resistor 14. The setpoint signal bears the same relation to the desired pressure as the signal from the input amplifier bears to the actual pressure. Additional circuitry, not shown, modifies the vacuum gauge signal so that the output of the input amplifier is in the same voltage range as the setpoint signal with reversed polarity. The two signals are then combined to give an error signal. When the actual pressure is equal to the desired pressure, the setpoint signal and the signal representing the actual pressure will be equal and opposite and consequently there will be no error signal. If the actual pressure signal is positive and the setpoint signal is negative as shown in the drawing, the error signal will be positive when the pressure in vacuum chamber 1 is too high and negative when the pressure is too low.

The error signal is delivered to amplifier 16 to increase the magnitude thereof to a value high enough to provide power to the control valve actuator which will normally be a reversible variable torque electric motor 18. The power is connected through a mechanical or hydraulic drive system 20 to control valve 5.

Control valve 5, driven by motor 18, throttles the gas being admitted to the vacuum chamber. Closing the valve decreases the absolute pressure in the chamber and opening the valve raises the pressure. Therefore, if a positive error signal is received, indicating that the pressure in the chamber is too high, the motor 18 will begin closing control valve 5. A negative error signal, indicating that the pressure in the vacuum chamber 1 is too low, will cause motor 18 to drive valve 5 in the opposite direction tending to open the valve. When the error signal is zero, the motor 18 will not move.

The present invention incorporates a second feedback loop which delivers a valve position feedback signal to junction 12 which tends to reduce the error signal.

A potentiometer 24 mechanically connected to motor 18 generates the valve position feedback signal which is transmitted to junction 12 through the variable decay circuit 26 and attenuator 28.

The variable decay circuit 26 consists of a capacitor connected through a variable resistor to the common line whereby the effective valve position feedback signal will decay to zero and will not cause an offset or permanent discrepancy between the actual pressure input signal and the setpoint signal so that a reliable calibration can be established between the setpoint and the vacuum gauge which is independent of the gas load or the capacity of the vacuum pump.

Attenuator 28 is a variable resistance to vary the magnitude of the valve position feedback signal relative to the error signal.

While any suitable drive means may be utilized for driving the control valve 5, the embodiment shown in the drawing herein described uses a reversible variable torque electric motor 18 to drive a gear train generally designated by the numeral 20. Motor 18 has a shaft 30 with a drive gear 32 mounted thereon. A driven gear 34 meshes with drive gear 32 and is mounted on drive screw 36 of a micrometer head designated generally by the numeral 38 used for actuating control valve 5.

Control valve 5 has a body portion 40 (FIG. II) with an inlet port 42 and an outlet port 44. An elongated tubular seat portion 46 is formed in outlet port 44 and communicates with a hollow portion of valve body 40. A piston member 48 is movably disposed within the hollow valve body and has an elongated needle element 50 formed at one end thereof. The needle 50 has a very slight taper varying from less than 0.001 to about 0.005 of an inch taper per inch of length. The piston 48 is centered in the hollow portion of the valve body 40 by guide members 52 and 54. A suitable sealing member 56 is provided to prevent leakage.

The piston 48 has a threaded portion 58 to receive matching threaded portion 60 formed on an end portion of screw 36. As is readily apparent from the drawing rotation of screw 36 causes piston 48 to move longitudinally through the hollow portion of valve body 40 and will move the nonrotating tapered needle 50 through the elongated tubular seat 46.

An ordinary needle valve provides a variable flow by changing the effective area of an orifice through which the gas flows. An orifice is defined as a passage of very short length compared to its area. The expression for flow through an orifice is $Q = K \times D^2$ where $D$ is equal to the diameter of the orifice and $Q$ is equal to the mass flow rate. For typical vacuum systems the flow rate must be very, very small. Achieving smooth control of flow thus demands more accurate control of the clearance between the needle and the orifice than is practical in conventional needle valves.

Flow through a long tube is given by the expression $Q = K \times D^3/L$ where $D$ equals the diameter of the tube, $L$ equals the length of the tube and $Q$ equals mass flow rate. From this expression it can be seen that the flow rate is directly proportional to the cube of the diameter of the tube and inversely proportional to its length instead of the square of the diameter as is the case with an orifice. In both formulas diametral clearance can be substituted for diameter. Since the length of the tube is larger than the diameter, this means that a given flow rate can be achieved with a larger, more easily manufactured diametral clearance, and since the length is a larger quantity, and influences flow only to the first power, changing the length of a tube is a smoother and more precise way to control flow than changing the diameter of an orifice.

The long needle 50 with a very, very slight taper near the end is moved longitudinally in the tubular seat portion 46 instead of in a short orifice as is the case in the conventional needle valve. The needle has a variable taper which may vary uniformly over the length or which may have segments with increasing or decreasing amounts of taper, best illustrated in FIG. VII of the drawing wherein 50a, 50b and 50c indicate sections of the needle having different degrees of taper. For very low flow rates, when the valve is nearly closed, the effective length of the tube is determined by the amount of the slight tapered portion of the needle which is in the tube. The flow rate is controlled by changing the length and the area of the tube simultaneously.

A micrometer head 38 is provided with a barrel 62 and a thimble 64 which may be read in the conventional manner to determine the effective length and diameter of the needle achieving smooth control of flow through the outlet port 44.

A gear 66 mounted on screw 36 drives gear 68 for rotation of a shaft 70 to drive the wiper of a conventional variable resistance or potentiometer 24. A second gear 72 mounted on shaft 70 meshes with and drives gear 74 mounted on shaft 76 to drive a cam element 78 to actuate a limit switch 80 to break the circuit between amplifier 16 and motor 18 when the piston 48 of valve 5 is in a fully open or fully closed position or at other predetermined piston locations to reduce the possibility of damage to the precision components of the controller.

It should be noted that additional cam operated switches may be provided for actuating other devices such as a computer. It is contemplated that the present invention can be used with a computer or other control device wherein a program may be established for testing gauges and other devices to simulate desired conditions such as those encountered at high altitudes, in outer space and on other planets, by varying the setpoint signal. The cam operated switches may be utilized to trigger the computer at predetermined valve positions.

It should be apparent from the foregoing description of one embodiment of our invention that we have developed a pressure controller which achieves smooth precision control of the pressure within a vacuum chamber in a simpler and more expeditious manner than is possible with any pressure controller heretofore developed.

While the specific details of the invention have been herein shown and described, changes and alterations may be resorted to without departing from the spirit and scope of the invention as defined in the appended claims.

I claim:

1. In a pressure control device: A chamber; a pump communicating with said chamber for evacuating the atmosphere therein; a valve forming a fluid coupling between the inside and outside of the chamber to regulate the chamber pressure; means responsive to deviation of the actual chamber pressure from the desired chamber pressure to generate an error signal, said chamber having a sufficiently large volume that a small volume of fluid introduced into or removed from the chamber will not appreciably change pressure in the chamber creating a time lag between movement of the valve and achievement of a desired chamber pressure; a feedback loop adapted to deliver a signal representative of the flow rate through the valve; means in the feedback loop to vary the magnitude of the signal representative of the flow rate through the valve relative to the magnitude of the error signal; means to combine the error signal and the signal representative of the flow rate through the valve to generate a modified error signal; and an actuator driven by the modified error signal acting to open and close said valve.

2. The combination called for in claim 1 wherein the feedback loop includes a potentiometer variable proportional to the movement of the valve adapted to deliver a voltage through the loop which varies with the flow rate through the valve.

3. The combination called for in claim 1 wherein the valve comprises a hollow body portion; inlet and outlet ports communicating with the hollow portion of the valve body; an elongated tubular seat portion disposed adjacent one of said ports; an elongated closure member having a slight taper; and means for moving said closure member through said tubular seat to regulate flow rate whereby the flow rate is determined by the relative length and diameter of the flow passage.

4. In a device for controlling pressure in a vacuum chamber: A chamber; evacuating means communicating with said chamber for continuously removing gas therefrom; valve means forming a fluid coupling between the inside and outside of the chamber to regulate the flow rate of gas into the chamber; a transducer coupled to the inside of the chamber for generating a signal representing the chamber pressure; an actuator connected to the valve means for opening and closing the valve means; a first servo loop between the transducer and the actuator to deliver an error signal to the actuator representing the difference between the actual and the desired chamber pressure to change the valve position; means to deliver a signal representative of the desired chamber pressure to the first servo loop; a second servo loop connected between the first servo loop and the valve means for delivering a valve position feedback signal to the first servo loop to prevent excessive valve movement; an attenuator in the second servo loop to vary the magnitude of the valve position feedback signal; and a variable decay circuit connected to the second servo loop to prevent permanent discrepancy between actual and desired chamber pressures.

5. In a pressure control device: A vacuum chamber; a pump communicating with the chamber for evacuating same; a source of gas; a pressure control valve forming a fluid coupling between the inside of the chamber and the source of gas; actuating means connected to the valve for regulating the flow rate of gas therethrough; a first servo loop including a gauge coupled to the inside of the chamber for generating an electrical signal related to the actual chamber pressure, means for generating a setpoint signal related to the desired chamber pressure; a junction for combining the said signals producing an error signal output representing the difference between the actual and the desired chamber pressure; and a second servo loop connected between the actuating means and the first servo loop for delivering a feedback signal into the first servo loop to compensate for movement of the valve and to prevent excessive movement wherein the actuating means is driven by the error signal and the feedback signal combined; means to vary the magnitude of the feedback signal relative to the magnitude of the error signal.

6. The combination called for in claim 5 wherein the first servo loop includes a variable lead circuit to cause a larger error signal to be generated for rapid changes in chamber pressures than for slow changes in chamber pressure.

7. The combination called for in claim 5 wherein the second servo loop includes a potentiometer having an output varying in relation to the valve position.

8. The combination called for in claim 7 wherein the potentiometer has opposite ends connected to opposite terminals of a source of electricity and a wiper connected to the second servo loop; and with the addition of a variable decay circuit connected between the second servo loop and the source of electricity to prevent permanent discrepancies between the signal related to the actual chamber pressure and the setpoint signal.

9. The combination called for in claim 8 wherein the second servo loop contains an attenuator for regulating the magnitude of the feedback signal.

10. The combination called for in claim 5 wherein the actuating means is a reversible variable torque motor, the output of which varies with the magnitude of the error signal and the feedback signal combined.

11. In a control device for regulating pressure in a chamber, means for evacuating fluid from the chamber; a valve having an elongated tubular port forming a flow passage, and a tapered closure member movable through the port to vary the length and diameter of the flow passage through the port; a reversible variable torque motor; means to connect the motor to the closure member to move the closure member through said port; means in fluid communication with the inside of the chamber to generate a first signal related to the actual chamber pressure; a first servo loop to transfer the first signal to the motor; a setpoint signal generator for generating a setpoint signal which bears the same relation to the desired chamber pressure as the first signal bears to the actual chamber pressure; means operably connected to the motor to generate a feedback signal related to the flow rate of fluid through the flow passage of the valve; a second servo loop for delivering the feedback signal to the first servo loop; means connected to the second servo loop to cause the feedback signal to decay; and means to combine the first signal, the feedback signal, and the setpoint signal to produce a combined signal in the first servo loop to energize the motor.